(12) United States Patent
Merkin et al.

(10) Patent No.: US 6,826,710 B2
(45) Date of Patent: Nov. 30, 2004

(54) SYSTEM AND METHOD FOR PROVIDING A FAULT-RESILIENT BOOT

(75) Inventors: Cynthia M. Merkin, Georgetown, TX (US); Stanley Leonard Merkin, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 411 days.

(21) Appl. No.: 09/770,010

(22) Filed: Jan. 25, 2001

(65) Prior Publication Data

US 2002/0099971 A1 Jul. 25, 2002

(51) Int. Cl.$^7$ .............................................. G06F 11/00
(52) U.S. Cl. .................................................. 714/6; 713/2
(58) Field of Search ................................ 714/6, 7, 8, 9, 714/13, 36; 713/1, 2

(56) References Cited

U.S. PATENT DOCUMENTS

| | | | |
|---|---|---|---|
| 5,608,275 A | | 3/1997 | Khosrowpour |
| 5,656,869 A | | 8/1997 | Gluskoter et al. |
| 5,790,850 A | * | 8/1998 | Natu ............................. 713/2 |
| 5,842,011 A | * | 11/1998 | Basu ............................ 713/2 |
| 5,933,631 A | * | 8/1999 | Mealey et al. ................ 713/2 |
| 6,446,203 B1 | * | 9/2002 | Aguilar et al. ................ 713/2 |
| 6,473,857 B1 | * | 10/2002 | Panas et al. .................. 713/2 |
| 6,594,786 B1 | * | 7/2003 | Connelly et al. ............. 714/50 |

* cited by examiner

*Primary Examiner*—Dieu-Minh Le
(74) *Attorney, Agent, or Firm*—Haynes and Boone, LLP

(57) ABSTRACT

A computer system configured to retrieve a preboot image from a first remote location and execute the preboot image. The preboot image is configured to cause the computer system to detect a status indication associated with a previous boot attempt by the computer system, and, in response to the status indication indicating a local boot attempt state, to retrieve a first boot image from a second remote location and to boot the computer system using the first boot image.

20 Claims, 2 Drawing Sheets

SYSTEM AND METHOD FOR PROVIDING A FAULT-RESILIENT BOOT

BACKGROUND

The disclosures herein relate generally to computer systems and more particularly to a system and method for providing a fault-resilient boot.

A computer system may be configured to operate in a kiosk or other remote location. When a computer system operates in a remote location, however, the ability of the computer system to reliability boot itself becomes a concern. In particular, the concern may focus on the reliability of the components of the computer system that are most responsible for booting the computer system, such as a hard disk drive. To ensure reliability, some computer systems may employ redundant components to provide a back-up to the primary components. Other computer systems may employ components that are designed with enhanced reliability characteristics. Unfortunately, redundant components or components with enhanced characteristics may increase the total cost of the computer system.

It would be desirable for a remote computer system to include a measure of reliability regarding its ability to boot. Therefore, what is needed is a system and method for providing a fault-resilient boot.

SUMMARY

One embodiment, accordingly, provides a computer system configured to retrieve a preboot image from a first remote location and execute the preboot image. The preboot image is configured to cause the computer system to detect a status indication associated with a previous boot attempt by the computer system, and, in response to the status indication indicating a local boot attempt state, to retrieve a first boot image from a second remote location and to boot the computer system using the first boot image.

A principal advantage of this embodiment is that it provides a computer system with a fault-resilient boot system and method. If the computer system fails to boot using a local boot image, the system retrieves a remote boot image and boots using the remote boot image. In addition, an administrator of the computer system can be notified of the problem automatically.

DETAILED DESCRIPTION

As used herein, the term computer system refers to any type of computing device configured to execute software including a thin client system that may not include one or more components of a traditional computer system.

Figure 1:
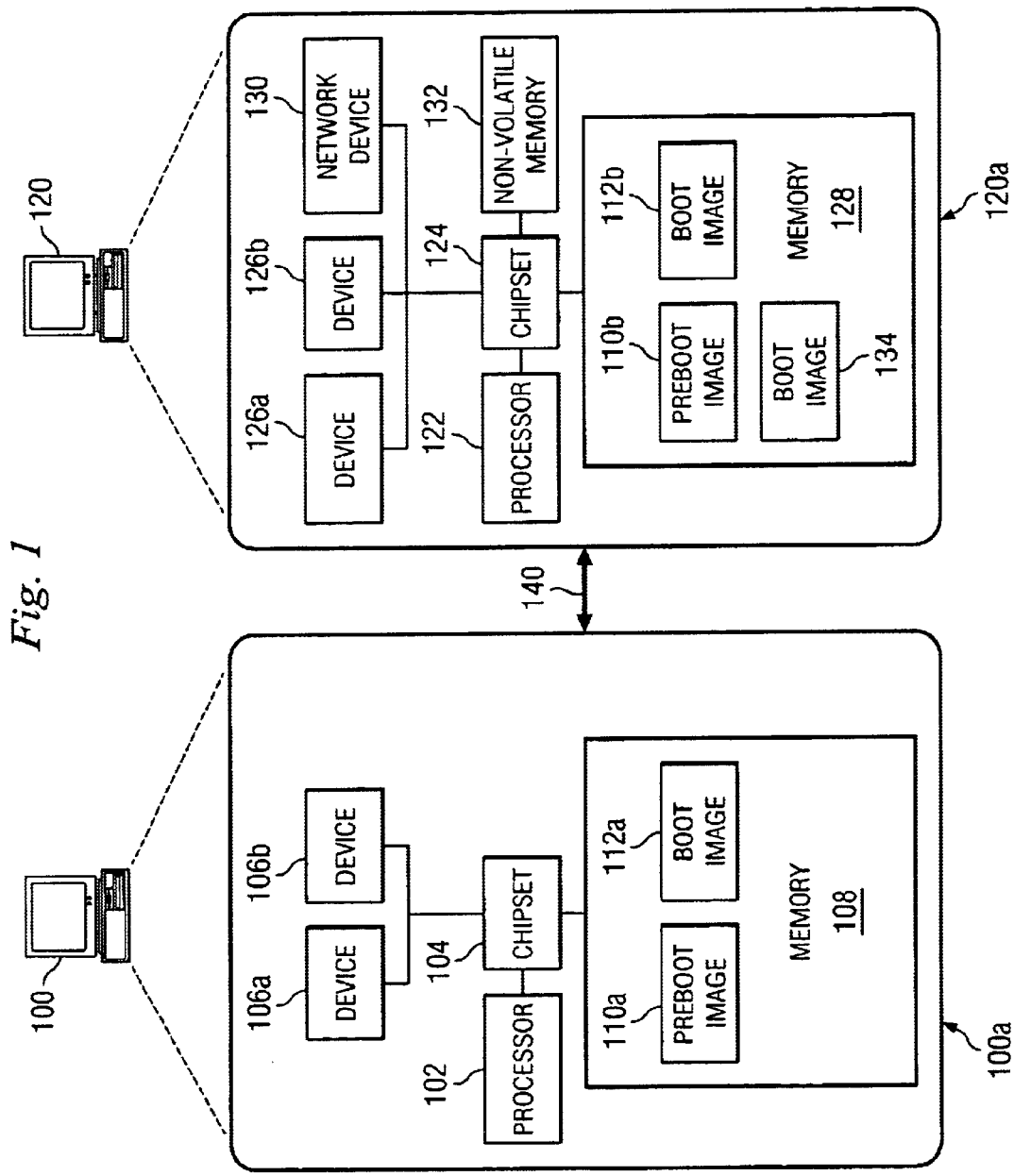
FIG. 1 is a diagram illustrating an embodiment of a client system coupled to a server.

FIG. 1 is a diagram illustrating an embodiment of a client system 120 coupled to a server 100. As shown in an expanded view 100*a*, server 100 includes a processor 102, a chipset 104, a plurality of devices 106*a* and 106*b*, and a memory 108. Memory 108 is configured to store preboot image 110*a* and boot image 112*a*. As shown in a expanded view 120*a*, client system 120 includes a processor 122, a chipset 124, a plurality of devices 126*a* and 126*b*, a memory 128, a network device 130, and a non-volatile memory 132. Memory 128 is configured to store preboot image 110*b*, boot image 12*b*, and boot image 134. Client system 120 and server 100 are configured to communicate using any suitable communications mechanism such as the Internet, an intranet, a local area network, a wide area network, or a wireless network as indicated by an arrow 140.

Client system 120 incorporates a fault-resilient boot system and method. In particular, client system 120 is configured to boot using a remote boot image in response to detecting a failure associated with an attempt to boot using a local boot image. As used herein, the term boot image refers to software configured to initialize a computer system and/or provide an operating environment. A boot image may include all or a part of an operating system such as Windows 95, Windows 98, Windows NT, or Windows 2000 from Microsoft Corporation.

The boot order of client system 120 is set to boot first to a preboot environment and then to a local hard disk drive. The boot order may be set in a system firmware such as a basic input output system or other software configured to bring client system 120 out of a reset state. In one embodiment, software or other services available in the preboot environment may be defined by the Preboot Execution Environment (PXE) Specification available from Intel Corporation, ftp://download.intel.com/ial/wfm/pxespec.pdf, and incorporated by reference herein.

In response to being powered up or reset, client system 120 initiates a system firmware (not shown) which in turn initiates the preboot environment. In response to the preboot environment being initiated, network device 130 causes a predefined preboot image to be found on a remote computer system and downloaded onto client system 120. In the embodiment of FIG. 1, network device 130 causes preboot image 110*a* to be retrieved from server 100 and copied into memory 128 as indicated by preboot image 110*b* being shown in memory 128.

Client system 120 executes preboot image 110*b*. Preboot image 110*b* includes instructions that are configured to cause client system 120 to determine whether to boot using local boot image 134 or remote boot image 112. Preboot image 110*b* includes instructions that cause this determination to be made using a status indication stored in non-volatile memory 132. Preboot image 110*b* also includes instructions that cause a state of the status indication to be changed in response to a previous state of the status indication as will be described in detail below.

In one embodiment, the status indication in non-volatile memory 132 indicates one of three possible states: an unknown state, a local boot attempt state, and a local boot successful state. The unknown state is the initial state. The local boot attempt state indicates that client system 120 attempted to boot using local boot image 134 on a previous boot attempt. The local boot successful state indicates that client system 120 successfully booted using local boot image 134 on a previous boot attempt. In other embodiments, other similar states or names of states may be used.

Preboot image 110*b* causes the state indicated by the status indication to be detected. In response to the state being an unknown state or a local boot successful state, preboot image 110*b* assumes that client system 120 booted successfully using local boot image 134 on a previous boot attempt. Accordingly, preboot image 110*b* causes the state of the status indication to be set to the local boot attempt state and causes control of client system 120 to be returned to the system firmware. The system firmware causes client system 120 to attempt to boot using local boot image 134. If client system 120 boots successfully using local boot image 134, then instructions in local boot image 134 cause the state of the status indication to be changed to the local boot successful state. If client system 120 does not boot successfully using local boot image 134, then local boot image 134 does not cause the state of the status indication to be changed, i.e. the state remains in the local boot attempt state. The next time client system 120 boots, preboot image 110*b* will either detect the local boot successful state indicating that client system 120 booted successfully using the local boot image on a previous boot attempt, or the local boot attempt state indicating that client system 120 did not boot successfully using the local boot image on a previous boot attempt.

In response to the state of the status indication being the local boot attempt state, preboot image 110*b* assumes that client system 120 did not boot successfully using local boot image 134 on a previous boot attempt. Accordingly, preboot image 110*b* causes boot image 112*a* to be located and downloaded onto client system 120. In the embodiment of FIG. 1, remote boot image 112*a* is retrieved from server 100 and copied into memory 128 as indicated by remote boot image 112*b* being shown in memory 128. Instead of causing control of client system 120 to be returned to the system firmware, preboot image 110*b* causes client system 120 to boot using remote boot image 112*b*. Preboot image 110*b* also causes an administrator to be notified that client system 120 failed to boot using local boot image 134 on a previous boot attempt. Preboot image 110*b* may notify the administrator in any suitable way such as by creating a log entry, sending an email, sending a message to a central computer system, or illuminating a visual indicator.

In the embodiment of FIG. 1, preboot image 110*a* and remote boot image 112*a* are stored on server 100. In other embodiments, preboot image 110*a* and remote boot image 112*a* may be stored in other storage locations accessible to client system 120. For example, preboot image 110*a* and remote boot image 112*a* may be stored on different servers or in the same or different disk array systems. In addition, client system 120 may access another server or other device to determine the location of preboot image 110*a* and remote boot image 112*a*.

Other variations may be made to the embodiment of FIG. 1. For example, the status indication may be stored in a storage location on client system 120 other than non-volatile memory 132 or may be stored externally from client system 120. Also, client system 120 may be a thin client system that does not include one or more components of a traditional computer system or may include other components not shown in FIG. 1. In addition, preboot image 110 may be stored on a portable storage device such as a floppy disk or a CD-ROM before being copied onto server 100.

Figure 2:
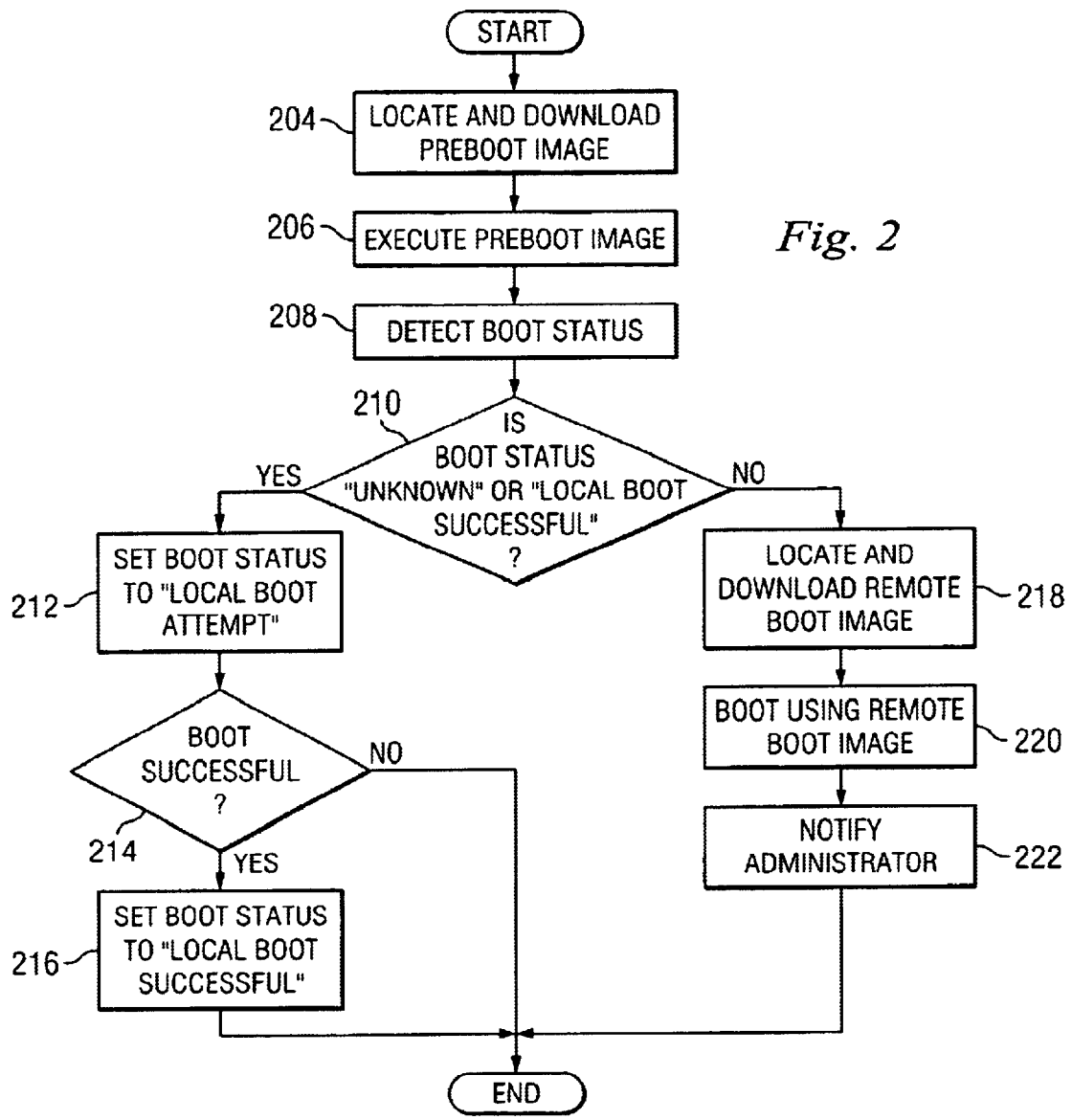
FIG. 2 is a flow chart illustrating an embodiment of a method for providing a fault-resilient boot.

FIG. 2 is a flow chart illustrating an embodiment of a method for providing a fault-resilient boot. In the embodiment of FIG. 2, a preboot image is located and downloaded to a computer system as indicated in step 204. The preboot image is executed on the computer system as indicated in step 206. A boot status is detected as indicated in step 208. A determination is made as to whether the boot status is "unknown" or "local boot successful" as indicated in step 210.

If the boot status is "unknown" or "local boot successful", then the boot status is set to "local boot attempt" as indicated in step 212. The computer system is booted using a local boot image located on the computer system as indicated in step 214. The boot status is set to "local boot successful" as indicated in step 216. It is noted that if the computer system fails to boot as described in step 214, then the boot status is not set to "local boot successful" as described in step 216.

If the boot status is not "unknown" or "local boot successful", then a remote boot image is located and downloaded as indicated in step 218. The computer system is booted using the remote boot image as indicated in step 220. An administrator is notified that the computer system booted using the remote boot image as indicated in step 222.

Figure 3:
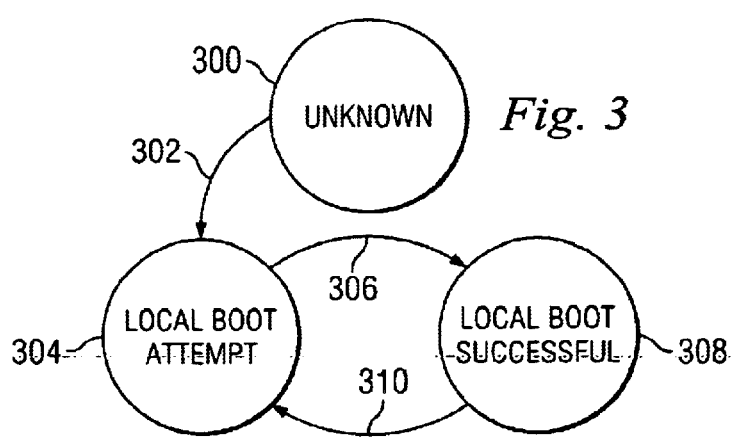
FIG. 3 is a state diagram illustrating an embodiment of states of a status indication.

FIG. 3 is a state diagram illustrating an embodiment of states of a status indication. As described above, the status indication may be stored in a non-volatile memory such as non-volatile memory 132 in FIG. 1. The status indication begins in an unknown state 300. In response to a computer system attempting to boot using a local boot image, the status indication is transitioned to a local boot attempt state 304 as indicated by an arrow 302. If the computer system successfully boots using the local boot image, then the status indication is transitioned to a local boot successful state 308 as indicated by an arrow 306. If the computer system does not successfully boot using the local boot image, then the status indication remains in local boot attempt state 304. From local boot successful state 308, the status indication is transitioned back to local boot attempt state 304 in response to the computer system attempting to boot using a local boot image.

Although the embodiment of FIG. 3 describes unknown state 300, local boot attempt state 304, and local boot successful state 308, other embodiments may use other names to describe these states. For example, unknown state 300 may be referred to as "initial" or "reset" state. Likewise, local boot attempt state 304 and local boot successful state 308 may be referred to by other names such as "previous local boot failed" and "previous local boot successful", respectively.

As can be seen, the principal advantages of these embodiments are that they provide a computer system with a fault-resilient boot system and method. If the computer system fails to boot using a local boot image, the system retrieves a remote boot image and boots using the remote boot image. In addition, an administrator of the computer system can be notified of the problem automatically. The computer system may be configured to provide this ability with little or no additional cost to the consumer.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system comprising:
   a computer system including a processor and a memory, the computer system configured to:
   include a preboot execution environment (PXE) specification wherein an initial boot order is set to PXE and subsequently to a hard disk;
   retrieve a preboot image from a first remote location; and
   execute the preboot image, the preboot image configured to cause the computer system to:

detect a status indication associated with a previous boot attempt by the computer system; and in response to the status indication indicating a local boot attempt state:

retrieve a first boot image from a second remote location, and boot the computer system using the first boot image.

2. The system of claim 1, wherein the preboot image is configured to cause the computer system to:

in response to the status indication indicating the local boot attempt state, notify an administrator.

3. The system of claim 1, wherein the preboot image is configured to cause the computer system to:

in response to the status indication indicating a local boot successful state or an unknown state, boot the computer system using a second boot image located on the computer system.

4. The system of claim 3, wherein the preboot image is configured to cause the computer system to:

in response to the status indication indicating a local boot successful state or an unknown state, set the status indication to the local boot attempt state prior to booting the computer system using the second boot image.

5. The system of claim 4, wherein the second boot image is configured to cause the computer system to:

set the status indication to a local boot successful state.

6. The system of claim 1, further comprising:

a server coupled to the computer system, the server including the first remote location and the second remote location.

7. The system of claim 1, further comprising:

a first server coupled to the computer system, the first server including the first remote location; and a second server coupled to the computer system, the second server including the second remote location.

8. The system of claim 1, wherein the computer system includes a non-volatile memory configured to store the status indication.

9. A computer program product comprising:

a computer program processable by a computer system for causing the computer system to:

include a preboot execution environment (PXE) specification wherein an initial boot order set to PXE and subsequently to a media drive;

detect a status indication associated with a previous boot attempt by the computer system; and in response to the status indication indicating a local boot attempt state:

retrieve a first boot image from a remote location; and boot the computer system using the first boot image; and a storage apparatus from which the computer program is accessible by the computer system.

10. The computer program product of claim 9, wherein the computer program is processable by the computer system for causing the computer system to:

in response to the status indication indicating the local boot attempt state, notify an administrator.

11. The computer program product of claim 9, wherein the computer program is processable by the computer system for causing the computer system to:

in response to the status indication indicating a local boot successful state or an unknown state, boot the computer system using a second boot image located on the computer system.

12. The computer program product of claim 11, wherein the computer program is processable by the computer system for causing the computer system to:

in response to the status indication indicating a local boot successful state or an unknown state, set the status indication to the local boot attempt state prior to booting the computer system using the second boot image.

13. The computer program product of claim 12, wherein the second boot image is processable by the computer system for causing the computer system to:

set the status indication to a local boot successful state.

14. A method performed by a computer system comprising:

providing a preboot execution environment (PXE) specification wherein an initial boot order is set to PXE and subsequently to a non-volatile media drive;

detecting a status indication associated with a previous boot attempt by the computer system; and in response to the status indication indicating a local boot attempt state:

retrieving a first boot image from a first remote location; and booting the computer system using the first boot image.

15. The method of claim 14, further comprising:

in response to the status indication indicating the local boot attempt state, notifying an administrator.

16. The method of claim 15, further comprising:

in response to the status indication indicating a local boot successful state or an unknown state, booting the computer system using a second boot image located on the computer system.

17. The method of claim 16, further comprising:

in response to the status indication indicating a local boot successful state or an unknown state, setting the status indication to the local boot attempt state prior to booting the computer system using the second boot image.

18. The method of claim 17, further comprising in response to booting the computer system using the second boot image, setting the status indication to a local boot successful state.

19. The method of claim 14, further comprising:

retrieving a preboot image from a second remote location; and executing the preboot image.

20. The method of claim 19, further comprising:

retrieving the first boot image from the first remote location on a first server; and retrieving the preboot image from the second remote location on a second server.

* * * * *